INVENTORS
NIKOLAI LASAREV,
MAURICE G. LEMOINE
BY
Robert G. Clay
ATTORNEY

INVENTORS
NIKOLAI LASAREV,
MAURICE G. LEMOINE
BY
Robert H. Clay
ATTORNEY

United States Patent Office 3,497,154

Patented Feb. 24, 1970

3,497,154

TAPE TENSION MEANS

Nikolai Lasarev, Palo Alto, and Maurice G. Lemoine, Redwood City, Calif., assignors to Ampex Corporation, Redwood City, Calif., a corporation of California Filed Mar. 29, 1968, Ser. No. 717,339
Int. Cl. B65h 25/22
U.S. Cl. 242—75.44 7 Claims

ABSTRACT OF THE DISCLOSURE

In a magnetic tape transport, tape tension is maintained at a predetermined value by means of a spring leaf tension arm that is bendably deflected by the tape to the degree corresponding with the actual tension therein, and a variable-resistance strain gauge mounted on the leaf and coupled into a reel controlling electrical circuit so as to alter the electrical resistance of the circuit in accordance with tape tension changes.

BACKGROUND OF THE INVENTION

The present invention relates to magnetic tape transports, and particularly to tape tensioning means therefor.

In a magnetic tape transport, the tape tension is maintension is required: variations in tension cause variations in elongation of the tape, and consequent variation in the time-base of the recorded signal, resulting in inaccurate reproduction of the signal. Previously in the art, tape has been tensioned by means of pivoted spring-loaded tension arms, which engage the tape and are pivotally displaced to a degree corresponding to the tension in the tape; and the displacement of the arm is sensed by a variety of means so as to provide a measure of the tension and to enable control of the reels or other tape tensioning elements in such a way as to maintain the tape at a desired tension. The displacement sensing means for the arm usually comprises a light source and photocell combination, or a differential transformer device, or a potentiometer, all of which are comparatively space-consuming, cumbersome, and expensive; and the spring-loaded tension arms are also space-consuming and complex.

Accordingly, it is an object of the invention to provide a tape tension control apparatus that is extremely compact in physical dimensions, having fewer parts, and capable of being manufactured and assembled with substantially reduced expense.

SUMMARY OF THE INVENTION

In a magnetic tape transport of the type in which the tape is metered by a capstan and tensioned by a brake applied to the supply reel and a motor applied to the takeup reel, the tape tension is maintained at a predetermined value by means of a pair of tension-sensing devices engaging the tape on either side of the capstan. Each device includes a spring leaf tension arm that is bendably deflected by the tape to a degree corresponding with the actual tension therein, and a variable-resistance strain gauge is mounted on each leaf and coupled into an electrical circuit so as to alter the electrical resistance of the circuit in accordance with tape tension changes. Means are also coupled to each circuit to control the respective reel brake and motor so as to restore the tape tension to the required value. The spring leaf tension arm and strain gauge assembly is much smaller and occupies substantially less space than the pivoting arms and sensing assemblies previously known in the art, and are therefore usable in structures in which the space required for pivoted arms does not exist; and the structure of the invention is substantially less expensive to manufacture and assemble.

DESCRIPTION OF THE PREFERRED EMBODIMENT

Figure 1:
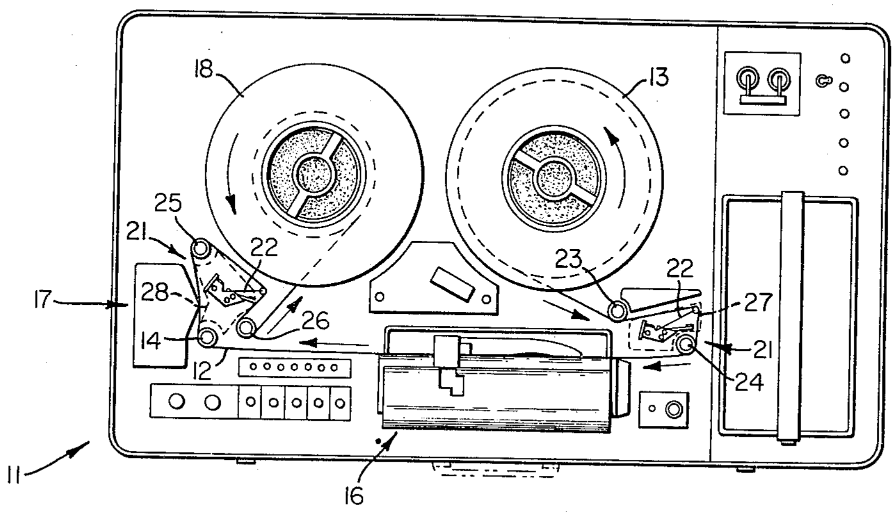
FIGURE 1 is a plan view of a magnetic tape transport including the invention.

Referring now to the drawing and particularly to FIGURE 1 thereof, there is shown a typical magnetic tape transport 11 with which the invention may be used. A magnetic tape 12 is wound on a supply reel 13 and is withdrawn therefrom by means of a capstan 14 so as to be moved under tension past a rotating head assembly 16 for recording and replay of information. The tape is tensioned between the capstan and supply reel by means of a motor or brake applied to the reel to resist the unwinding rotation of the reel; in the illustrated transport, a brake is used. The tape downstream from the capstan is caused to pass under a stationary longitudinal head assembly 17 and is then wound up on a takeup reel 18, which is driven by a motor (not shown). The tension in the tape between the capstan and takeup reel is maintained by a takeup reel drive motor. The reel motor and brake may be of any suitable type known in the art and are not shown here.

It will be understood that a regulation of the tension of the tape as it passes across the head assembly 16 and 17 is an important requirement for proper operation of the transport, because the tape is to some degree elastic and is stretched to a slight degree according to the value of the tension. If the tape were recorded at one tension and played back at another, the time base of the recorded signal would accordingly be altered and the signal would not be accurately reproduced. It is therefore desirable to record the tape at a predetermined constant tension, and to play it back at that same predetermined constant tension. Furthermore, in the illustrated transport, no pinch roller is used with capstan 14, and the frictional metering engagement of tape and capstan is maintained entirely by tape tension acting through a large angle of wrap, e.g., substantially 90 degrees. To ensure constant speed metering of the tape by the capstan there must be no slippage of the tape at the capstan, and to this end it is important that the tape tensions upstream and downstream from the capstan be maintained at close to the same values. For example, slippage can be avoided with an upstream-downstream tension ratio of about 1.5 to 1.0 or the inverse when the wrap angle is about 90 degrees; or about 3.0 to 1.0 with a wrap angle of 180 degrees. However, the capstan system power consumption is minimal if the upstream-downstream tensions are precisely equal. Accordingly, there are shown in the drawing a pair of tension sensing and control combinations 21 (also shown in FIGURES 2 and 2) each comprising primarily a spring leaf tension arm 22 over the end of which the tape is passed in passage from the supply reel to the capstan and from the capstan to the takeup reel. From the supply reel, the tape passes over a roller guide 23, the supply reel tension arm 22, and thence over a roller guide 24 and to the head assembly 16. From the capstan 14, the tape passes over the head assembly 17, thence over a roller guide 25, thence over the takeup reel tension arm 22, thence over a roller guide 26 to the takeup reel. A pair of cover plates 27 and 28, illustrated in phantom, may be provided for covering and protecting the assemblies 21. The guides 23, 24 and 25, 26 are arranged to guide the tape in such a way that the tape is bent at the tension arm 22 in substantially a right angle, and both tension arms 22 define substantially the same acute angles to the approaching and departing portions of the tape. Thus the resultants of the tape tension vectors acting on each of the tension arms 22 are substantially the same for any given value of tension.

Figure 2:
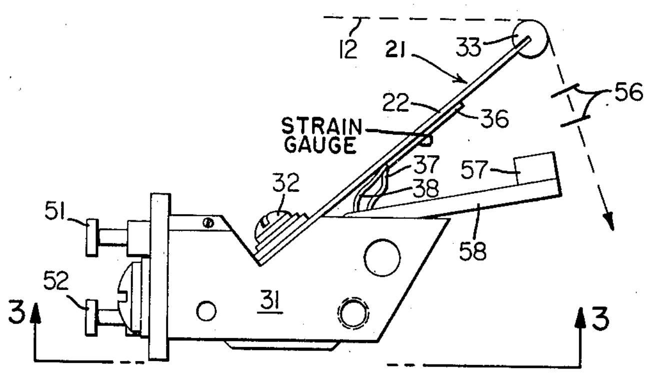
FIGURE 2 is an enlarged plan view of the structure of the invention shown in FIGURE 1.

Referring to FIGURE 2, the structure of the tension arm 22 and associated apparatus is illustrated in greater detail. The tape 12 is shown in a relaxed condition, as if there were no tension therein, and the tension arm 22 is shown as a spring leaf element solidly mounted on a mounting block 31 as by means of bolts 32, and having mounted at the free end thereof a rounded guide element 33 of a length that is approximately equal to the width of the tape and is smooth and highly polished so as to present the least possible frictional resistance to the passage of the tape. Preferably as shown in the drawing, the tape is guided so that the back side and not the oxide side engages the guide 33.

Figure 3:
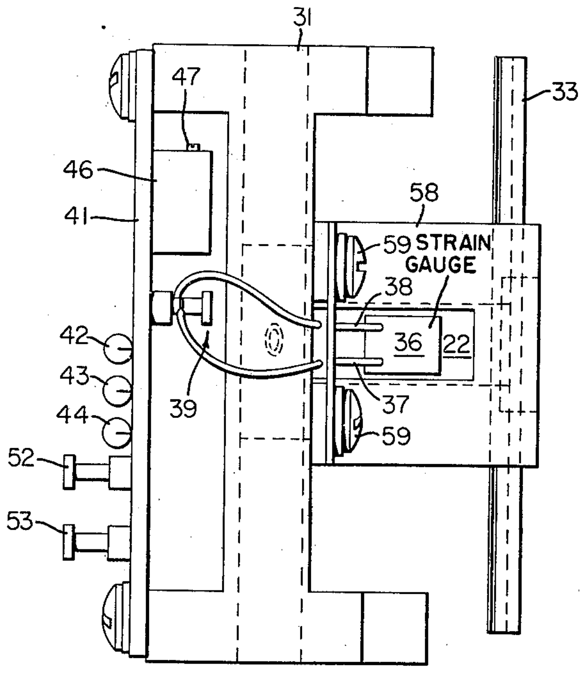
FIGURE 3 is an elevation view taken substantially on the plane of lines 3—3 of FIGURE 2.

It will be understood that when the tape is placed under tension, the spring leaf 22 is resiliently bent or flexed to a degree of deflection that is a function of the tape tension. The object of the invention is to sense the actual tension in the tape, and to regulate the reel brake or motor in such a way that this tension is maintained at a predetermined value. Accordingly, there is mounted on a flat side of the tension arm 22 a variable electrical resistance strain gauge 36 of a type well known in the art. In one actual construction of the invention, there was used a semi-conductor strain gauge SNB1-16-35S9 manufactured by Baldwin Lima Hamilton Corporation of Waltham, Massachusetts. This gauge is temperature-compensated and has an electrical resistance that varies according to the degree to which the gauge is flexed. The gauge is glued or cemented to the spring leaf arm 22, using adhesives and methods well known in the art, and thereafter is flexed whenever the spring leaf 22 is flexed, and to a comparable degree. The electrical resistance of the gauge therefore constitutes a continuing measure of the instantaneous tension in the tape, and the gauge is connected into an electrical circuit later to be described, which continuously measures this resistance. The mounting block 31 is attached to the top plate of the tape transport in any suitable manner known in the art, and the electrical leads 37 and 38 from the strain gauge are coupled to terminal posts generally indicated by the numeral 39, mounted on a circuit board 41 that is mounted on the block 31. On the circuit board 41 are mounted three resistors 42, 43 and 44, and a potnetiometer element 46, the latter having a screw driver adjustable element 47 for adjusting the null point of the potentiometer. The three resistors and the potentiometer are coupled in a circuit, later to be described, having output terminals 51 and 52, and a voltage terminal 53, also mounted on the circuit board 41. A ground terminal 54 (FIGURE 4) is also mounted on the circuit board 41 directly behind terminal 51 in FIGURE 2 and terminal 53 in FIGURE 3.

Also shown in FIGURE 2 are a series of graduation marks 56 that are marked on the tape transport top plate during the process of manufacture, for indicating the actual deflections of the arm 22 under various calibrated tension loadings. Since the deflection needed for a given tension is thus calibrated, it is easy in practice to adjust the potentiometer 46 by means of the element 47 so that a desired tension is produced in the tape, without actually having to measure this tension independently.

Also shown in FIGURE 2 is a rubber pad stop element 57, which is solidly mounted on a rigid cantilever arm 58 that is attached to the block 31 by means of bolts 59, for stopping the deflection of the arm 22 in the event of a tension overload.

Figure 4:
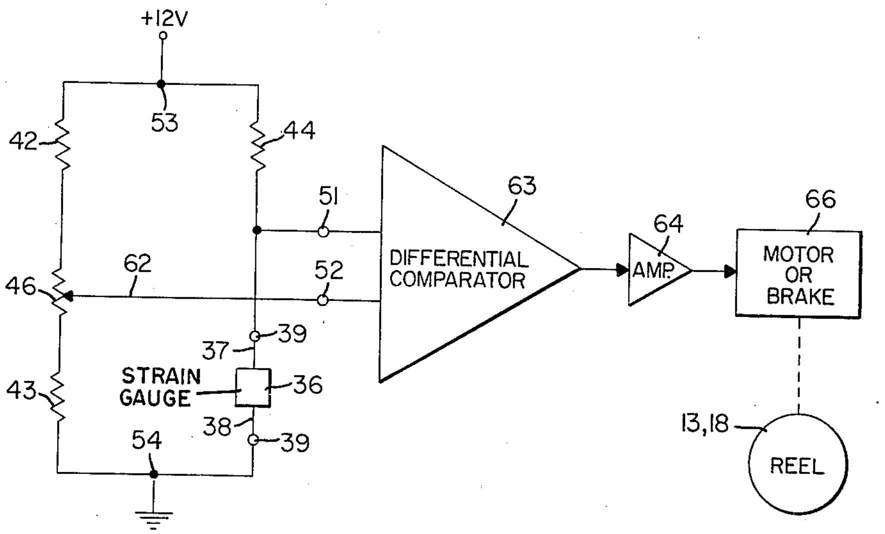
FIGURE 4 is a schematic diagram showing the electrical circuits of the invention.

FIGURE 4 illustrates a suitable circuit for use of the invention to control the tape reels so as to produce the desired tension, The variable resistance strain gauge 36, and the resistors 42, 43 and 44 are coupled in a bridge associated with the potentiometer 46. As shown, the strain gauge 36 and the resistor 43 are connected to the ground terminal 54, and the resistors 42 and 44 are connected to the voltage terminal 53. The potentiometer 46 is connected in series between the resistors 42 and 43, and the null point contact 62 of the potentiometer is coupled to the output terminal 52, which is in turn coupled to an input of a differential comparator 63. The output terminal 51 is connected between the resistor 44 and the strain gauge 36, and also to the other input of the differential comparator 63. The comparator 63 compares the voltages in the circuit at the points corresponding to the terminals 51 and 52, which should be equal when the bridge is in balance and when the tension in the tape is the one that is pre-selected by the particular setting of the potentiometer contact 62. If the voltages are not in balance, the comparator 63 provides an output error signal, which is sent through an amplifier 64 to control the motor or brake 66 and the corresponding reel 13, 18. If the downstream tension on the takeup reel side of the capstan is too gerat, the energization of the associated reel motor is reduced to correspondingly reduce the tension; and if the tension is too small, the energization of the motor is increased. Likewise with the supply reel 13, if the tension upstream from the capstan is too great, the associated supply reel brake is relieved, and if the tension is too small, the brake is applied with greater force.

It will be understood that where two tension sensing devices 21 are used, as in FIGURE 1, then each requires a separate circuit of the type shown in FIGURE 4, and the potentiometers 46 thereof are adjusted to provide precisely the same predetermined tensions both upstream and downstream from the capstan.

If the tape breaks, the brake on the supply reel immediately stops the tape upstream, and the downstream tape is wound up on the takeup reel. A speed limiting device may be provided in the takeup reel motor to prevent runaway thereof.

It will also be recognized that the provision of the tension sensing means above described in association with a low-inertia spring leaf arm enables limited tape storage and the damping of high frequency tape tension perturbations beyond the range of the rigid sensing arms previously known in the art. Also, since no rotating parts are used, the present invention has less frictional wear and longer life.

We claim:

1. In a tape transport wherein tape is metered by a capstan and tensioned by tape-engaging means spaced therefrom, the combination comprising:

a spring leaf tension arm of uniform thickness solidly mounted on said tape transport between said capstan and said tape-engaging tensioning means and having a free end extending therefrom at an acute angle to the path of said tape, so as to be bendably deflected in accordance with the degree of tension in said tape, said arm having a smoothly rounded tape engaging element on the free end thereof and engaging said tape;

means mounted on said arm and movable therewith for sensing the degree of deflection of said arm and the degree of tension in said tape; and means coupled to said sensing means and to said tape-engaging tensioning means for controlling said tape-engaging tensioning means so as to maintain a predetermined degree of bending in said (bendable means) arm corresponding to a predetermined tension in said tape.

2. The combination recited in claim 1, wherein:

said sensing means comprises a variable resistance strain gauge mounted on said arm and bendable therewith so as to produce a change in the electrical resistance of said gauge in accordance with the degree of said deflection and the degree of tension in said tape.

3. The combination recited in claim 2, wherein:

said controlling means includes an electrical bridge circuit in one arm of which said strain gauge is coupled so as to cause unbalance of said bridge circuit when said arm is deflected to a greater or less degree than a predetermined value.

4. The combination recited in claim 3, wherein:

said controlling means also includes means coupled to said bridge circuit for sensing the unbalance thereof and for controlling said tape tensioning means to restore the balance of said bridge circuit.

5. The combination recited in claim 4, wherein:

said tape-engaging tensioning means includes a tape takeup reel and a motor therefor, energized to tend to pull said tape in a direction away from said capstan; and said bridge-circuit sensing means includes a voltage comparator means producing an error signal indicative of the imbalance of said bridge circuit, and means for receiving said error signal and for controlling the energization of said motor to restore the balance of said bridge circuit.

6. The combination recited in claim 4, wherein:

said tape-engaging tensioning means includes a tape supply reel and a brake therefor, and means for operating said brake to tend to hold back said tape in a direction away from said capstan; and said bridge-circuit sensing means includes a voltage comparator means producing an error signal indicative of the imbalance of said bridge circuit, and means for receiving said error signal and for controlling the operation of said brake operating means to restore the balance of said bridge circuit.

7. Two combinations as recited in claim 4, wherein said tape is guided around said capstan in a substantial angle of wrap and is caused to frictionally engage said capstan by means of the tape tension alone, and wherein:

said tape-engaging tensioning means includes a tape takeup reel and a drive motor therefor spaced downstream from said capstan, and a tape supply reel and a brake therefor spaced upstream from said capstan, the tension arm of a first of said combinations engaging said tape downstream from said capstan and between said capstan and said takeup reel, and the tension arm of a second of said combinations engaging said tape upstream from said capstaon and between said capstan and said supply reel;

the bridge-circuit sensing means for said first combination includes a first voltage comparator means producing a first tape tension error signal, and means for receiving said first error signal and for controlling the energization of said motor to restore the downstream tension to a predetermined value;

the bridge-circuit sensing means for said second combination includes a second voltage comparator means producing a second tape tension error signal and means for receiving said second error signal and for controlling the operation of said brake to restore the upstream tension to said predetermined value; and the bridge-circuit in each of said first and second combinations includes a potentiometer adjustable to set both said upstream and downstream tensions at substantially the same predetermined values, whereby slippage of said tape at said capstan is avoided.

References Cited

UNITED STATES PATENTS

| | | | |
|---|---|---|---|
| 2,267,107 | 12/1941 | Juillard | 242—75.51 |
| 2,983,464 | 5/1961 | Fuller | 242—75.44 |
| 3,027,059 | 3/1962 | Streeter | 242—75.51 X |
| 3,031,152 | 4/1962 | Cohen et al. | 242—75.51 |
| 3,386,681 | 6/1968 | Waterhouse et al. | 242—75.44 |

NATHAN L. MINTZ, Primary Examiner

U.S. Cl. X.R.

242—75.51